(12) United States Patent
Schmit (10) Patent No.: US 9,490,555 B1
(45) Date of Patent: Nov. 8, 2016

(54) SYSTEM OR CONNECTOR FOR VOLTAGE BUS STRUCTURES

(71) Applicant: Deere & Company, Moline, IL (US)

(72) Inventor: Christopher J. Schmit, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/720,035

(22) Filed: May 22, 2015

(51) Int. Cl.
H01R 9/05 (2006.01)
H01P 3/06 (2006.01)
H01R 12/70 (2011.01)

(52) U.S. Cl.
CPC . *H01R 9/05* (2013.01); *H01P 3/06* (2013.01); *H01R 12/7076* (2013.01)

(58) Field of Classification Search
USPC .................. 439/78, 213; 361/783, 328, 697
See application file for complete search history.

(56) References Cited

U.S. PATENT DOCUMENTS

| | | | | |
|---|---|---|---|---|
| 2,796,458 A | * | 6/1957 | Hartmann | H01B 5/06 138/114 |
| 2,964,835 A | * | 12/1960 | Hay | F42B 3/14 102/202.9 |
| 4,272,646 A | * | 6/1981 | Carlson | H02G 5/007 174/88 B |
| 4,842,533 A | * | 6/1989 | Beberman | H02G 5/007 174/88 B |
| 4,886,940 A | * | 12/1989 | Gagnon | H02G 5/007 174/16.2 |
| 5,115,375 A | * | 5/1992 | Garay | H05K 7/142 361/760 |
| 5,579,217 A | * | 11/1996 | Deam | H01L 23/52 174/72 B |
| 5,760,339 A | * | 6/1998 | Faulkner | H01R 25/162 174/88 B |
| 6,072,690 A | * | 6/2000 | Farooq | H01G 4/30 257/E23.067 |
| 6,146,169 A | * | 11/2000 | Calder | H02G 5/06 439/210 |
| 6,302,987 B1 | * | 10/2001 | Wojnarowski | H02G 5/005 156/151 |
| 7,002,789 B1 | * | 2/2006 | Georgopoulos | H01G 2/04 29/25.41 |
| 7,453,114 B2 | * | 11/2008 | Hosking | H01G 4/232 257/308 |
| 7,557,298 B2 | * | 7/2009 | Vanhoutte | H02G 5/005 174/149 B |
| 7,819,681 B1 | * | 10/2010 | Rodrigues | H02G 5/007 174/88 B |
| 8,378,219 B2 | * | 2/2013 | Lesieur | H02G 5/007 174/129 B |
| 8,743,560 B2 | * | 6/2014 | Kim | H05K 1/0231 174/255 |
| 8,760,847 B2 | * | 6/2014 | Dooley | H01G 4/30 361/328 |
| 8,785,784 B1 | * | 7/2014 | Duford | H02K 3/26 174/255 |
| 8,964,387 B2 | * | 2/2015 | Meinecke | H02H 7/065 165/185 |
| 9,011,167 B2 | * | 4/2015 | Fujiwara | H01B 5/02 439/121 |

(Continued)

*Primary Examiner* — Alexander Gilman (57) ABSTRACT

A first bus structure comprises a first outer conductive layer and a first inner conductive layer separated by a an first dielectric layer. A second bus structure comprises a second outer conductive layer and a second inner conductive layer separated by a second dielectric layer. An outer sleeve electrically connects the first inner conductive layer to the second inner conductive layer. An inner sleeve electrically connects the first outer conductive layer to the second outer conductive layer. A fastener extends through the inner sleeve to clamp or compress the first outer conductive layer and the second outer conductive layer toward each other.

17 Claims, 6 Drawing Sheets

(56) References Cited

U.S. PATENT DOCUMENTS

| | | | |
|---|---|---|---|
| 9,166,309 B1* | 10/2015 | Costello | H01R 25/161 |
| 9,237,669 B2* | 1/2016 | Iwata | H02M 7/003 |
| 2005/0233625 A1* | 10/2005 | Faulkner | H02G 5/007 |
| | | | 439/210 |
| 2012/0229948 A1* | 9/2012 | Sawyer | H01G 4/32 |
| | | | 361/301.1 |
| 2012/0229977 A1* | 9/2012 | Hosking | H01G 4/35 |
| | | | 361/688 |
| 2013/0308362 A1* | 11/2013 | Karlsson | H02M 7/003 |
| | | | 363/141 |
| 2015/0333423 A1* | 11/2015 | Busch | H05K 7/1469 |
| | | | 439/78 |
| 2016/0037660 A1* | 2/2016 | Budde | H01R 12/7076 |
| | | | 361/729 |

* cited by examiner

SYSTEM OR CONNECTOR FOR VOLTAGE BUS STRUCTURES

FIELD OF DISCLOSURE

This disclosure relates to system or connector for voltage bus structures.

BACKGROUND

Voltage bus structures may be used in vehicles, such as electrically propelled vehicles or hybrid vehicles that are propelled by internal combustion engines, electric motors, or both. In certain applications, the voltage bus structure may be configured to operate with a peak or maximum operating voltage, a peak or maximum operating current, or both. In the context of certain vehicles, high voltage operating conditions may entail a peak or maximum operating voltage of up to approximately 1200 volts direct current (VDC), for example. In some prior art bus structures and connectors, the switching performance and efficiency of a power semiconductor switch may be degraded if the semiconductor switch is fed from a direct current bus with inflated inductance or capacitors are required to compensate for the inductance.

In certain prior art, one or more conductive connectors (e.g., conductive rectangular bus straps or laminated bus straps of opposite polarity) between different voltage bus structures may be separated to prevent short circuits and arcing, which tends to lead to excessive inductance. For example, the separation of the positive and negative terminals (or traceable electrical paths within the system) can create one or more inductance loops that allow the energy of the system to be dissipated within re-circulation loops or parasitic inductance loops. For certain vehicle or electronics applications International Electrotechnical Commission (IEC) standards for electrical power connectors may recommend or require approximately three millimeters of separation for a 700 volt system to allow for clearances and thermal tolerances. Because of this separation requirement, the inductance of the system is increased. The inductance losses not only reduce the system efficiency, but can require the conductive connections (e.g., conductors) to be oversized to handle the resultant increased electrical current to compensate for inductive loss. The increased electrical current can heat up one or more connectors or the high voltage buses, which tends to increase material costs for conductors and other materials that can withstand higher temperatures than the system would otherwise require if the parasitic or inductance loss was low. Accordingly, there is need for the connector for voltage bus structures to handle efficiently high voltage operating conditions.

SUMMARY

In accordance with one embodiment, a system of or for voltage bus structures relates to a first bus structure and a second bus structure. A first bus structure comprises a first outer conductive layer and a first inner conductive layer separated by a first dielectric layer. A second bus structure comprises a second outer conductive layer and a second inner conductive layer separated by a second dielectric layer. An outer sleeve electrically connects the first inner conductive layer to the second inner conductive layer. An inner sleeve electrically connects the first outer conductive layer to the second outer conductive layer. A fastener extends through the inner sleeve to clamp or compress the first outer conductive layer and the second outer conductive layer toward each other.

DETAILED DESCRIPTION

As used throughout this document, the system 11 shall refer collectively to first bus structure 10, the second bus structure 22, the inner sleeve 74, the outer sleeve 70, its or their dielectric layers 72, the fastener 40 and the retainer 42. A connector 55 or coaxial connector 55 portion comprises an inner sleeve 74 that is radially spaced apart from an outer sleeve 70, where the inner sleeve 74 and the outer sleeve 70 or electrically conductive, or formed of metals or alloys.

In accordance with one embodiment, a system 11 or connector 55 for voltage bus structures (10, 22) relates to a first bus structure 10 and a second bus structure 22. A first bus structure 10 comprises a first outer conductive layer 12 and a first inner conductive layer 14 separated by a first dielectric layer 16. A first outer hole 32 is in the first outer conductive layer 12; a first inner hole 34 is in the first inner conductive layer 14. In one embodiment, the first outer hole 32 has a first outer radius and the first inner hole 34 has a first inner radius, where the first outer hole 32 has a lesser radius or size than the first inner radius. In particular, the first outer radius of the first outer hole 32 may be of commensurate size to a corresponding radius of a shaft 75 of the fastener 40, whereas the first inner radius may be of commensurate size to receive the corresponding outer radius of the inner sleeve 74 or its outer dielectric layer 72.

A second bus structure 22 comprises a second outer conductive layer 24 and a second inner conductive layer 18 separated by a second dielectric layer 20. A second outer hole 38 is in the second outer conductive layer 24; a second inner hole 36 is in the second inner conductive layer 18. In one embodiment, the second outer hole 38 has a second outer radius and the second inner hole 36 has a second inner radius, where the second outer hole 38 has a lesser radius or size than the second inner radius. In particular, the second outer radius of the second outer hole 38 may be of commensurate size to a corresponding radius of a shaft 75 of the fastener 40, whereas the second inner radius may be of commensurate size to receive the corresponding outer radius of the inner sleeve 74 or its outer dielectric layer 72.

In an alternate embodiment, the first bus structure 10, the second bus structure 22, or both may comprise a circuit board, or a printed circuit board (e.g., double-sided circuit board). For example, the first bus structure 10 or the second bus structure 22 may use a ceramic substrate, a polymer substrate, a plastic substrate, a fiberglass substrate, or composite substrate as the first dielectric layer 16 or the second dielectric layer 20, respectively. Further, the conductive layers (12, 14, 18, 24) may comprise conductive traces, microstrips, stripline, high-power parallel-plate transmission lines, or ground planes.

An outer sleeve 70 electrically connects the first inner conductive layer 14 to the second inner conductive layer 18. An inner sleeve 74 electrically connects the first outer conductive layer 12 to the second outer conductive layer 24. A fastener 40 extends through the inner sleeve 74 to clamp or compress the first outer conductive layer 12 and the second outer conductive layer 24 toward each other.

In one embodiment, the inner sleeve 74 has an outer dielectric layer 72 such that the inner sleeve 74 is electrically insulated from the outer sleeve 70. In another embodiment, the inner sleeve 74 has an outer dielectric layer 72 such that the inner sleeve 74 is electrically insulated from the outer sleeve 70 and forms a section of coaxial transmission line for transmitting direct current (DC) signals, low frequency alternating current (AC) signals, or both (simultaneously or at separate discrete times). For instance, the outer sleeve 70 could be grounded, while the direct current signal propagates in the inner sleeve 74 or while an alternating current signal propagates in the region between the inner sleeve 74 and the outer sleeve 70. In one example, the combination of the inner sleeve 74, its outer dielectric layer 72, the outer sleeve 70, its outer dielectric layer 72 comprise the coaxial connector 55 or segment of coaxial transmission line. In another example, the combination of the inner sleeve 74, its outer dielectric layer 72, the outer sleeve 70, its outer dielectric layer 72, the fastener 40 and the retainer 42 comprise the coaxial connector 55 or segment of coaxial transmission line.

In one configuration, one end 91 of the inner sleeve 74 electrically and mechanically contacts the first outer conductive layer 12, and an opposite end 93 of the inner sleeve 74 electrically and mechanically contacts the second outer conductive layer 24. For example, one substantially annular end (91) of the inner sleeve 74 electrically and mechanically contacts a respective substantially annular region of the first outer conductive layer 12, and an opposite substantially annular end (93) of the inner sleeve 74 electrically and mechanically contacts a respective substantially annular region of the second outer conductive layer 24.

Similarly, one end 95 of the outer sleeve 70 electrically and mechanically contacts the first inner conductive layer 14, and an opposite end 97 of the outer sleeve 70 electrically and mechanically contacts the second inner conductive layer 18. For example, one substantially annular end (95) of the outer sleeve 70 electrically and mechanically contacts a respective substantially annular region of the first inner conductive layer 14, and an opposite substantially annular end (97) of the outer sleeve 70 electrically and mechanically contacts a respective substantially annular region of the second inner conductive layer 18.

An enclosure 26 has an opening 99 for receiving the outer sleeve 70 or its outer dielectric layer 72. For instance, the opening 99 of the enclosure 26 may be associated with opposing substantially cylindrical walls that are capable of mating, with or without a seal, and are sealed with an seal 51, such as an O-ring. In one embodiment, the outer sleeve 70 comprises a dielectric layer 72 to form an insulated barrier with respect to the enclosure 26 (e.g., particularly if the enclosure is composed of a metal and if electrical connection or coupling is not wanted). The enclosure 26 has first enclosure portion 28 that is secured to a second enclosure portion 30, and wherein one or more seals (50, 51) or gaskets provide a barrier to prevent coolant for leaking from an interior chamber 52 of the enclosure 26 to an exterior 56.

In one embodiment, the enclosure 26 may be associated with an optional inlet port 101, an outlet port 102, or both (e.g., in the first enclosure portion 28 or the second enclosure portion 30) for circulating fluid via a pump or the combination of a pump, radiator and conduit or tubing (e.g., connected in series between the inlet port and the outlet port). The inlet port 101 and the outlet port 102 are shown as dashed lines to indicate that they are optional and may comprise threaded or unthreaded connectors or tubular studs.

The fastener 40 comprises a bolt and a retainer 42 that are electrically insulated from the first outer conductive layer 12 and the second outer conductive layer 24 by a plurality of insulators 47. Each of the insulators 47 has a first ring portion 46 and second ring portion 48.

A compression washer 44 is associated with one end of the fastener 40 or both ends of the fastener 40. The first outer conductive layer 12 has an elevated region 60 overlying an elevated dielectric portion 62; the second outer conductive layer 24 has an elevated region 60 overlying an elevated dielectric portion 62.

In the first bus structure 10, the first outer conductive layer 12 and the first inner conductive layer 14 can carry currents, such as direct current voltage of opposite polarity or alternating currents of different phases or different polarity. In the second bus structure 22, the second outer conductive layer 24 and the second inner conductive layer 18 can carry currents, such as direct current voltage of opposite polarity or alternating currents of different phases or different polarity.

For example, the first outer conductive layer 12 and the second outer conductive layer 24 are capable of carrying direct current of first polarity, while the first inner conductive layer 14 and the second inner conductive layer 18 are capable of carrying direct current of a second polarity, wherein the first polarity is opposite with respect to the second polarity. The first outer conductive layer 12 and the second outer conductive layer 24 are capable of carrying alternating current of first polarity, while the first inner conductive layer 14 and the second inner conductive layer 18 are capable of alternating current of a second polarity, wherein the first polarity is opposite with respect to the second polarity, wherein the alternating current has a frequency that is below approximately 100 kilohertz (kHz).

In accordance with one embodiment, a connector 55 for voltage bus structures supports a reliable, stable electrical and mechanical connection between a first bus structure 10 and a second bus structure 22. Each bus structure (10, 22) may comprise bus structures that is capable of carrying high voltage (e.g., within a range of approximately 120 volts to 1200 volts direct current), high current (e.g., within a range of approximately 10 Amps to 120 Amps), or both with inducing minimal inductance to the system 11 for a vehicle, electric machine, electric motor, or generator. The connector 55 may use only one fastener 40 and an associated retainer 42 (e.g. nut), which tends to minimize assembly time.

The coaxial connector 55 is capable of being cooled by coolant in an interior chamber 52 of an adjacent enclosure 26, where the enclosure 26 has an opening (e.g., substantially cylindrical opening) for receiving at least a portion (e.g., coaxial portion) of the connector 55 for efficient thermal dissipation from the connector 55. In one embodiment, the enclosure 26 comprises a first enclosure member or portion 28 and a second enclosure member or portion 30 where generally annular regions around the opening 99 can be sealed by seal 50, gasket, sealant to confine the coolant to the interior 52 of the enclosure 26 to prevent the coolant from leaking or other egress to the exterior 56 of the enclosure 26. Accordingly, the first bus structure 10 and the second bus structure 22 can be cooled in conjunction with connector 55 portion that passes through the enclosure 26 with an interior filled with coolant or coolant circulated by a pump via optional ports (101, 102). Further, in some embodiments, the first bus structure 10 and the second bus structure 26 can rely upon the cooling associated with enclosure 26 for active cooling with a circulated coolant and any exposed surface areas of the bus structures (10, 22) for passive heat dissipation from ambient air of the without need for additional coolant chambers or enclosures associated with the first bus structure 10 or the second bus structure 22.

In an alternate embodiment, a thermal interface material may fill or be injected into any air gap (e.g., a generally annular shaped region) that would otherwise exist between the opening 99 and the outer sleeve 70 or its dielectric layer 72. For example, the thermal interface material may comprise a thermally conductive grease, tape, or filler, where the tape or filler can comprises a polymer, a plastic, metallic particles, or other filler materials that have greater thermal conductivity than air. The thermal interface material is thermally conductive material that can be used to decrease the thermal resistance between the connector 55, the outer sleeve 70, or its dielectric layer 72 and the enclosure 26 (e.g., to promote heat dissipation or transfer form thermal energy in the connector 55 to the coolant in the interior 52 of the enclosure). In still other embodiments, a portion of the outer sleeve 70 or the opening 99 may be wedge-shaped or somewhat conical force or squeeze the thermal interface material into an appropriate position between the connector 55, the outer sleeve 70, or its dielectric layer 72 and the enclosure 26.

Here, the connector 55 comprises a coaxial bus connector defined by at least the inner sleeve 74 and the outer sleeve 70 (and the intervening dielectric layer 72). The inner sleeve 74 and the outer sleeve 70 may comprise round, high electrical conductivity tubes, that are arranged to connect one flat parallel plate bus structure (e.g., 10) to another flat parallel plate bus structure (e.g., 22). In one configuration, a couple of insulating sleeves 72 separate the inner sleeve 74 and the outer sleeve 70 from each other as well as insulate the outer sleeve 70 from the enclosure 26.

In an alternative embodiment, the outer dielectric layer 72, or the outer sleeve 70, or both could be notched or grooved to hold an optional seal (e.g., O-ring) to seal (and separate) the outer sleeve 70 to (or from) the enclosure 26 or to replace the dielectric layer 72.

Figure 1:
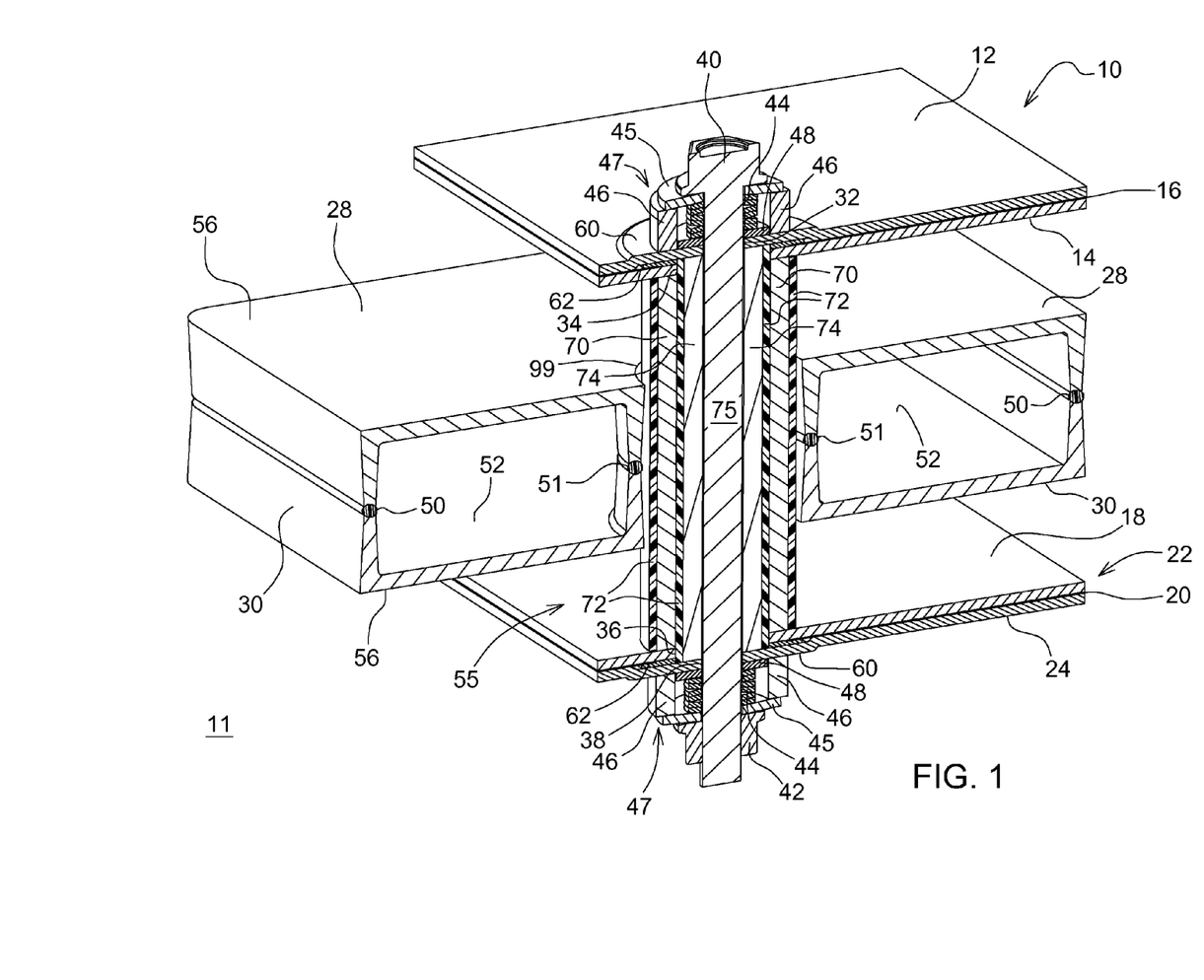
FIG. 1 is a perspective cross-sectional view of the connector for voltage bus structures in accordance with the disclosure.
Figure 2:
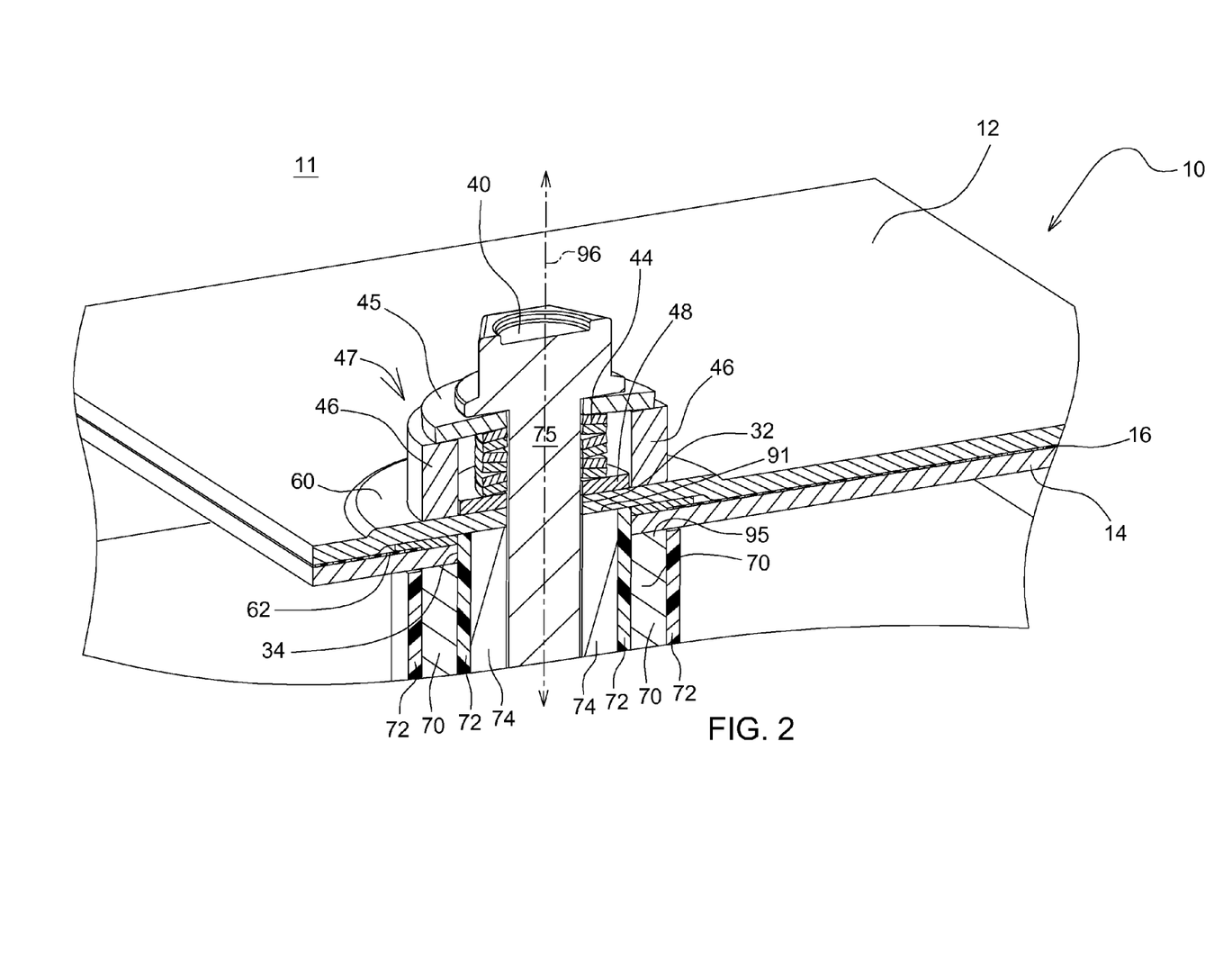
FIG. 2 is perspective cross-sectional view an upper portion of the connector of FIG. 1.
Figure 3:
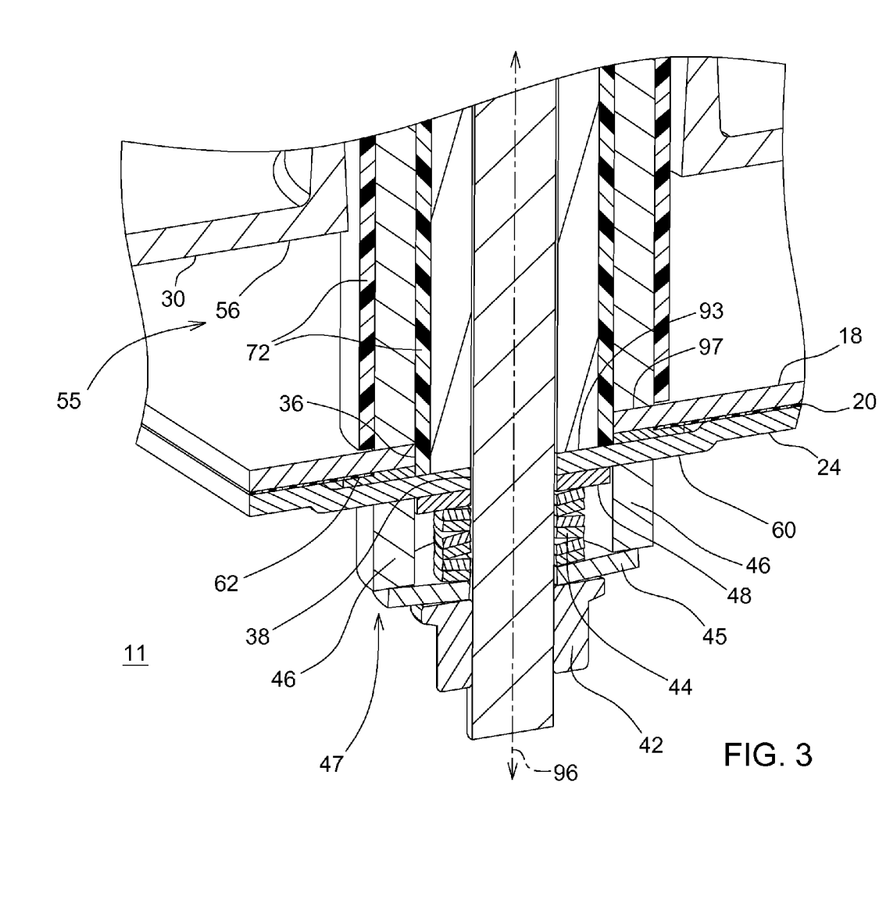
FIG. 3 is a perspective cross-sectional view of a lower portion of the connector of FIG. 1.
Figure 4:
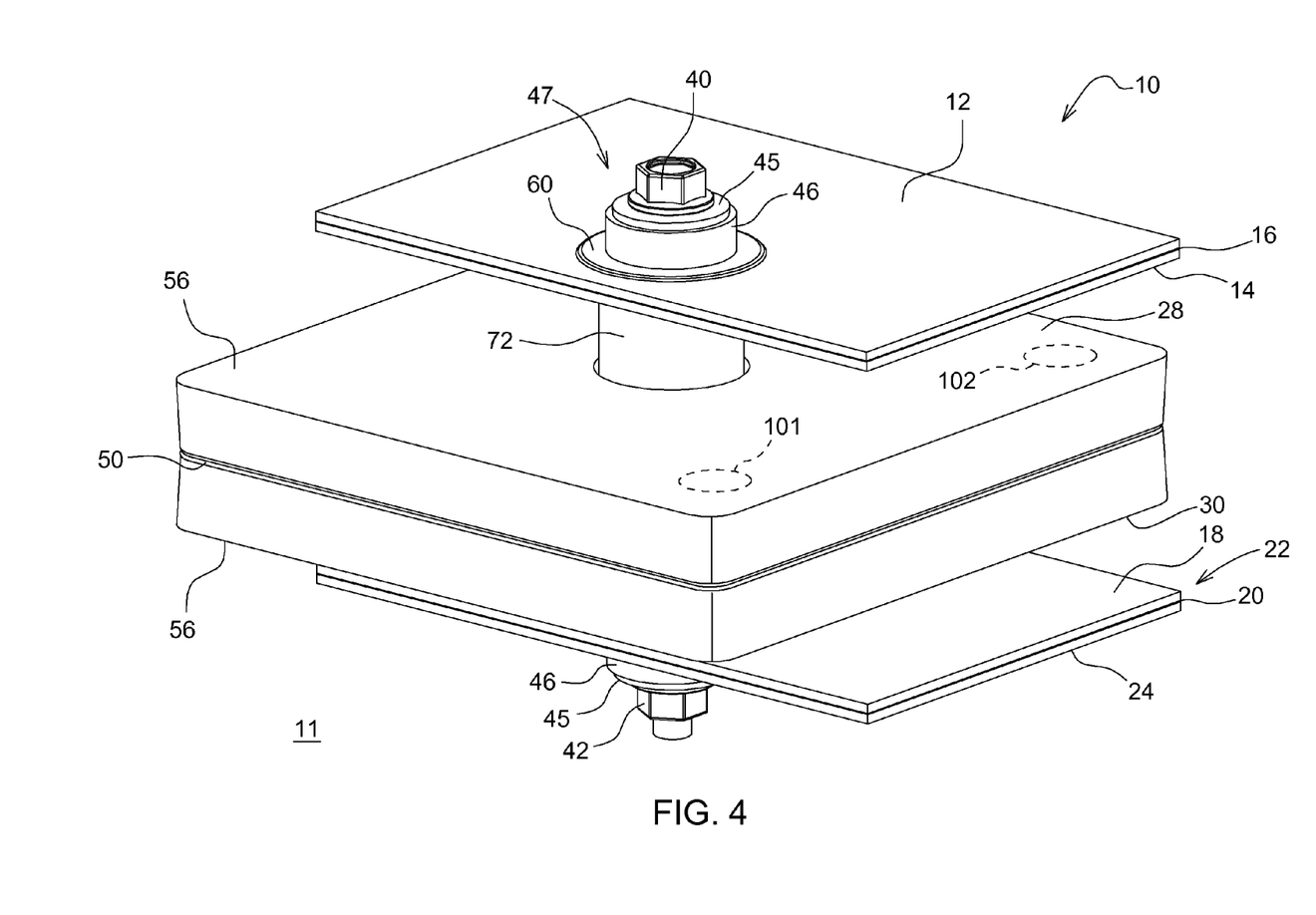
FIG. 4 is a perspective top view of the connector for voltage bus structures.
Figure 5:
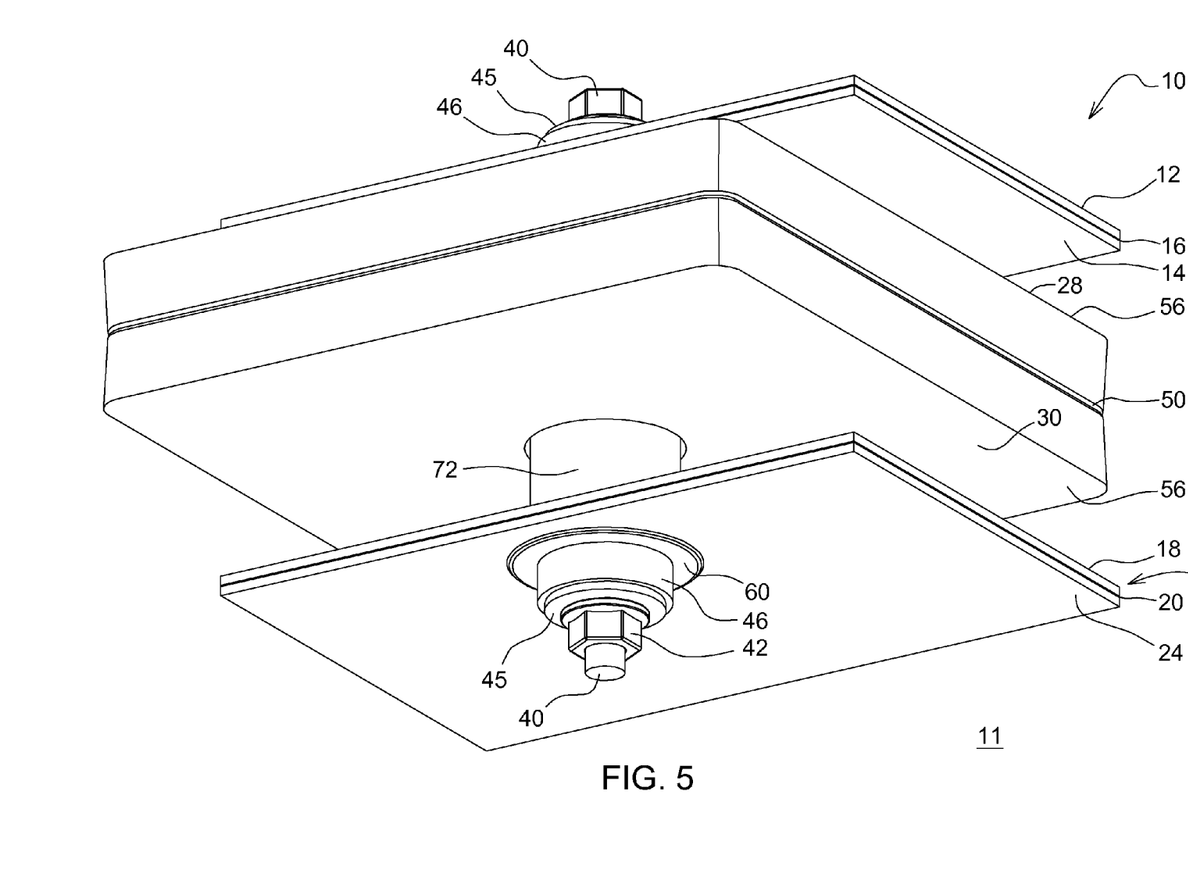
FIG. 5 is perspective bottom view of the connector for voltage bus structures.
Figure 6:
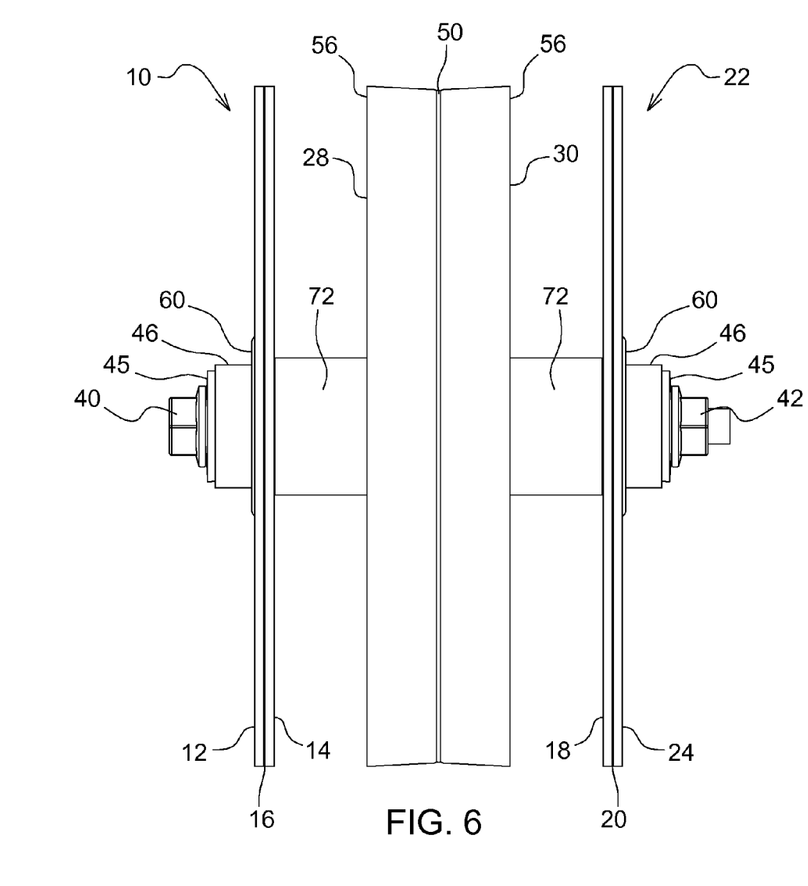
FIG. 6 is a side view of a connector.

Each pair of ends (91 and 95, or 93 and 97) of the sleeves (70, 74) are stepped with respect to one another with the inner sleeve 74 nested or positioned coaxially inside the outer sleeve 70 along axis 96, as illustrated in FIG. 2 and FIG. 3. The stepped end interface of the sleeves (70, 74) allows each generally planar, laminate bus structure (10, 22) to connect electrically with the inner sleeve 74 and the outer sleeve 70.

The system 11 is held, clamped compressed, or urged together with one fastener 40 and associated retainer 42, such as a threaded or other connection. Compression of the assembled system 11 is maintained by sets of compression washers 44 (e.g., Belleville washers) that intervene between a head of the fastener and one bus structure (10, 12) and between the retainer 42 and the other bus structure (10, 12). In one embodiment, insulation of certain parts of the bus system 11 with respect to the sleeves (70, 74) can be provided by a set of non-creeping insulators 47 to control or adjust the reactance or inductance of the coaxial connector 55. Insulators 47 provide electrical insulation or isolation between the compression washers 44 and the first inner conductive surface 14 and the second inner conductive surface 18. For example, each insulator 47 may comprise a first dielectric ring portion 46 and a second dielectric ring portion 48.

In one embodiment, the thickness of the first dielectric layer 16 of the first bus structure 10 is of a suitable thickness (e.g., approximately 10 thousands of an inch to approximately 25 thousandths of an inch, or approximately 0.00254 millimeters to approximately 0.00635 millimeters) to provide electrical insulation or electrical isolation between the first inner conductive layer 14 and the first outer conductive layer 12. For example, in one embodiment the thickness of the dielectric can be sufficient to comply IEC standards, while minimizing the thickness of the first dielectric layer 16 to lower the inductance (e.g., equal to or less than 10 nano-Henries) to the extent where compensating capacitors are not required for the first bus structure 10 to provide direct current potential to power one or more semiconductor switches.

In one embodiment, the thickness of the second dielectric layer 20 of the second bus structure 22 is of a suitable thickness (approximately 10 thousands of an inch to approximately 25 thousandths of an inch, or approximately 0.00254 millimeters to approximately 0.00635 millimeters) to provide electrical insulation or electrical isolation between the second inner conductive layer 18 and the second outer conductive layer 24. For example, in one embodiment the thickness of the second dielectric can be sufficient to comply IEC standards, while minimizing the thickness of the second dielectric layer 20 to lower the inductance (e.g., equal to or less than 10 nano Henries) to the extent where compensating capacitors are not required for the second bus structure 22 to provide direct current potential to power one or more semiconductor switches.

In one embodiment, the dielectric thickness of the dielectric layer of the inner sleeve 74 conforms substantially to IEC requirements or standards (e.g., to meet a certain creep requirements, such as from thermal expansion or differential thermal movement). The dielectric thickness of the dielectric layer 72 of the inner sleeve 74 may be selected or chosen to minimize the insulation thickness to lower the inductance of the coaxial connector 55.

The first bus structure 10 and the second bus structure 22 may carry direct current signals, alternating current signals or both. The first bus structure 10 and the second bus structure 22 may be coupled to a direct current source via electrolytic capacitors or a bank of filtering capacitors to reduce or minimize ripple current in the direct current voltage supplied to the bus structures; hence, the semiconductor switching devices.

In one embodiment, the enclosure 26 comprises a first enclosure portion 28 secured to a second enclosure portion 30 via one or more fasteners, retainers, adhesives or clamps. In one configuration, the enclosure 26 is composed of a plastic, polymer, composite, a plastic filled with a filler, a polymer filled with a filler or fiber, a filler or fiber embedded within a binding matrix resin. The first enclosure portion 28 is capable of mating with the second enclosure portion 30 at a mating interface. The mating interface may have a channel or groove to receive or more seals (50, 51) to provide flow of coolant for cooling the coaxial connection without impacting the inductance/capacitance of the bus systems 11.

In an alternate embodiment, an enclosure 26 composed of metal or an alloy can be used if the coaxial dielectric layers have sufficient thickness to avoid coupling between the enclosure 26 and the coaxial connector 55. The enclosure 26 composed of metal or an alloy may be used to block radio frequency interference or electromagnetic interference from interfering with any circuitry in the interior 52 of the enclosure 26, if the interior 52 houses electronic components instead of containing coolant. The enclosure 26 composed of metal can stop propagation of the electromagnetic interface from an outside the enclosure 26 entering the enclosure 26.

In an alternate embodiment, the dielectric layer 72 of the outer sleeve 70 may be omitted or made thinner on a portion of the outer sleeve 70 that engages the interior surface (e.g., substantially cylindrical interior) of the opening 99 to facilitate electrical or electromagnetic coupling between the metal enclosure 26 and the outer sleeve 70 or the electrical terminal associated with the outer sleeve 70.

As shown, each outermost washer 45 appears to comprise a ring or washer. Each inner compression washer 44 is disposed axially inward from the outermost washer 45. Each inner compression washer 44 comprises a compression washer, such as a tempered steel or Bellville washer.

In one embodiment, the first outer conductive layer 12 and the first inner conductive layer 14 may be composed of metal or metal alloys, including copper, nickel and aluminum. Similarly, the second outer conductive layer 24 and the second inner conductive layer 18 may be composed of metal or metal alloys, including copper, nickel and aluminum.

The fastener 40 may comprise a bolt, a threaded stud, or the like. The fastener 40, retainer 42 (e.g., nut), outer washer 45, and compression washer 44 (e.g., Bellville washers) may be composed of class 8.8 through 10.9 steel hardware, brass, bronze, nickel plated steel, or stainless steel, for example. In particular, class 8.8 through 10.9 steel hardware is cost effective is generally compatible with copper and certain copper alloys, such as Electrical Tough Pitch Copper.

In certain embodiments, that the inner sleeve 74 and the outer sleeve 70 each comprise tubes that are the same metal as the conductive layers to avoid galvanic corrosion. The inner sleeve 74 and the outer sleeve 70 can use C11000 series or C10000 series copper. C11000 is the standard Electrical Tough Pitch Copper (ETP). ETP covers most or all the variants of the C11000 and C10000 series copper.

In alternate embodiments, additional metals or metal alloys could be used for the fastener 40, the retainer 42, and sleeves (70, 74) or other hardware including phosphor-bronze, beryllium-copper, or another metal or alloy.

Here, in some embodiments, the coaxial connector 55 is round or substantially cylindrical to facilitate a simple, reliable and cost-effective seal 51 (e.g., O-ring is allowed to seal the enclosure 26 together at or near the generally annular regions).

In accordance with certain embodiments of this disclosure, the connector 55 with the coaxial configuration may be used without compensating capacitors or de-coupling capacitors to compensate for elevated inductance of the connector 55. The design of the connector 55 is well-suited for use on bus structures (e.g., direct current buses) that are used to drive power switching semiconductors (e.g., insulated gate, bipolar transistors) of inverters or controllers for controlling electric machines, electric motors, or generators in a motoring mode, a braking mode, or power generating mode without de-coupling capacitors to compensate for elevated inductance of the connector 55. Accordingly, the cost and weight of the de-coupling capacitors can be eliminated (while maintaining acceptable inductance levels) in the commercial examples of inverters, controllers or certain other electronic devices that use the connector 55 in accordance with this disclosure.

In certain configurations, the coaxial connector 55 of the disclosure is well-suited for controlling or minimizing inductance to obviate any need for oversized connectors or special metal alloys to compensate for any elevated inductance of the connector 55, which can lead to a reduction in size, weight and cost in the commercial examples of inverters, controllers or other electronic devices that use the connector 55 in accordance with this disclosure.

Further, in accordance with this disclosure, in one embodiment, the connector 55 only requires one fastener 40 and an associated retainer 42, whereas other alternative bus connections may require multiple fasteners, with additional attendant sets of washers and insulators.

Having described on or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The following is claimed:

1. A system for voltage bus structures, the system comprising:
    a first bus structure comprising a first outer conductive layer and a first inner conductive layer separated by a an first dielectric layer;
    a second bus structure comprising a second outer conductive layer and a second inner conductive layer separated by a second dielectric layer;
    an outer sleeve for electrically connecting the first inner conductive layer to the second inner conductive layer;
    an inner sleeve for electrically connecting the first outer conductive layer to the second outer conductive layer; and
    a fastener extending through the inner sleeve to clamp or compress the first outer conductive layer and the second outer conductive layer toward each other.

2. The system for a voltage bus structure according to claim 1 wherein the inner sleeve has an dielectric layer such that the inner sleeve is electrically insulated from the outer sleeve.

3. The system for a voltage bus structure according to claim 1 wherein one end of the inner sleeve electrically and mechanically contacts the first outer conductive layer, and an opposite end of the inner sleeve electrically and mechanically contacts the second outer conductive layer.

4. The system for a voltage bus structure according to claim 1 wherein one end of the inner sleeve electrically and mechanically contacts a substantially annular region of the first outer conductive layer, and an opposite end of the inner sleeve electrically and mechanically contacts a substantially annular region of the second outer conductive layer.

5. The system for a voltage bus structure according to claim 1 wherein one end of the outer sleeve electrically and mechanically contacts the first inner conductive layer, and an opposite end of the outer sleeve electrically and mechanically contacts the second inner conductive layer.

6. The system for a voltage bus structure according to claim 1 wherein one end of the outer sleeve electrically and mechanically contacts a substantially annular region of the first inner conductive layer, and an opposite end of the outer sleeve electrically and mechanically contacts a substantially annular region of the second inner conductive layer.

7. The system for a voltage bus structure according to claim 1 further comprising an enclosure with an opening for receiving the outer sleeve.

8. The system for a voltage bus structure according to claim 7 wherein the outer sleeve comprises a dielectric layer to form an insulated barrier with respect to the enclosure.

9. The system for a voltage bus structure according to claim 7 wherein the enclosure has first enclosure member that is secured to a second enclosure member, and wherein a seal or gasket provides a barrier to prevent coolant for leaking from an interior chamber of the enclosure.

10. The system for a voltage bus structure according to claim 1 wherein the fastener comprises a bolt and a retainer that are electrically insulated from the first outer conductive layer and the second outer conductive layer by a plurality of insulators.

11. The system for a voltage bus structure according to claim 10 wherein each of the insulators has a first ring portion and second ring portion.

12. The system for a voltage bus structure according to claim 10 wherein a compression washer is associated with one end of the fastener or both ends of the fastener.

13. The system for a voltage bus structure according to claim 10 wherein the first outer conductive layer has an elevated region overlying an elevated dielectric portion; wherein the second outer conductive layer has an elevated region overlying an elevated dielectric portion.

14. The system for a voltage bus structure according to claim 1 wherein the first outer conductive layer and the second outer conductive layer are capable of carrying direct current of first polarity, while the first inner conductive layer and the second inner conductive layer are capable of carrying direct current of a second polarity, wherein the first polarity is opposite with respect to the second polarity.

15. The system for a voltage bus structure according to claim 1 wherein the first outer conductive layer and the second outer conductive layer are capable of carrying alternating current of first polarity, while the first inner conductive layer and the second inner conductive layer are capable of alternating direct current of a second polarity, wherein the first polarity is opposite with respect to the second polarity.

16. The system for a voltage bus structure according to claim 1 wherein each of the first bus structure and the second bus structure comprises a circuit board.

17. The system according to claim 1 wherein the inner sleeve is axially longer than the outer sleeve.

* * * * *

UNITED STATES PATENT AND TRADEMARK OFFICE
CERTIFICATE OF CORRECTION

| | | |
|---|---|---|
| PATENT NO. | : 9,490,555 B1 | |
| APPLICATION NO. | : 14/720035 | |
| DATED | : November 8, 2016 | |
| INVENTOR(S) | : Christopher J. Schmit | |

It is certified that error appears in the above-identified patent and that said Letters Patent is hereby corrected as shown below:

In the Specification

At Column 1 after Line 7, insert the following:
--GOVERNMENT LICENSE RIGHTS
This invention was made with U.S. government support under contract or award No. DE-EE0006521 awarded by the Department of Energy. The Government has certain rights in the invention.--

Signed and Sealed this
Fourth Day of August, 2020

Andrei Iancu
*Director of the United States Patent and Trademark Office*